United States Patent [19]

Hoskins et al.

[11] Patent Number: 4,640,534
[45] Date of Patent: Feb. 3, 1987

[54] FLUID COUPLING ASSEMBLY

[75] Inventors: John T. Hoskins, 16 Cobblestone Ct., Orchard Park, N.Y. 14127; Steven R. Zillig; James E. Caroll, both of Williamsville, N.Y.

[73] Assignees: John T. Hoskins; Robert G. Zillig

[21] Appl. No.: 840,111

[22] Filed: Mar. 14, 1986

[51] Int. Cl.⁴ .............................................. F16L 37/14
[52] U.S. Cl. .................................. 285/158; 285/305; 285/321; 285/921
[58] Field of Search ................... 285/4, 158, 276, 277, 285/305, 319, 321, 921, 403, 81, 91; 165/140, 141, 178

[56] References Cited

U.S. PATENT DOCUMENTS

| 763,317 | 6/1904 | Nelson . | |
| 809,759 | 1/1906 | Toole et al. . | |
| 921,691 | 5/1909 | Friday . | |
| 1,513,710 | 10/1924 | Lewis . | |
| 1,514,130 | 11/1924 | Clements . | |
| 2,318,965 | 5/1943 | Parker et al. . | |
| 2,898,130 | 8/1959 | Hansen . | |
| 3,149,362 | 9/1964 | Smithson . | |
| 3,215,455 | 11/1965 | Fiala | 285/321 |
| 3,314,696 | 4/1967 | Ferguson | 285/305 |
| 3,315,990 | 4/1967 | Kramer | 285/321 |
| 3,450,424 | 6/1969 | Calisher | 285/305 |
| 3,538,940 | 11/1970 | Graham | 285/305 |
| 3,540,760 | 11/1970 | Miller et al. . | |
| 3,948,548 | 4/1976 | Voss | 285/321 |
| 4,244,608 | 1/1981 | Stuemky | 285/305 |
| 4,423,892 | 1/1984 | Bartholomew . | |
| 4,519,449 | 5/1985 | Hoskins et al. . | |
| 4,524,995 | 6/1985 | Bartholomew . | |
| 4,538,679 | 9/1985 | Hoskins et al. . | |

FOREIGN PATENT DOCUMENTS

| 96475 | 12/1983 | European Pat. Off. | 285/305 |
| 1396434 | 3/1965 | France | 285/305 |
| 85/02672 | 6/1985 | PCT Int'l Appl. . | |

Primary Examiner—Cornelius J. Husar
Assistant Examiner—Eric K. Nicholson
Attorney, Agent, or Firm—Christel, Bean & Linihan

[57] ABSTRACT

A fluid coupling for connecting a fluid line to a threaded port. The coupling includes a male member having a free end, a shoulder portion, and a tapered portion between the free end and the shoulder portion. The female member is provided with an enlarged portion, a groove in a reduced diameter portion which is disposed on the male coupling side of the female coupling, and a threaded end portion on the other side. The female member also has a bore having an enlarged portion and a reduced diameter portion, the reduced diameter portion in turn receiving an O-ring. Slots are provided in the female member between the spring clip groove and the enlarged portion for the reception of a spring clip. The parts are so dimensioned that the O-ring will be contacted about its entire periphery during insertion of the male member into the female member to prevent damage to the male member, the spring clip engaging the shoulder portion of the male member to hold the parts together in their sealing relationship when the male member has been fully inserted.

3 Claims, 6 Drawing Figures

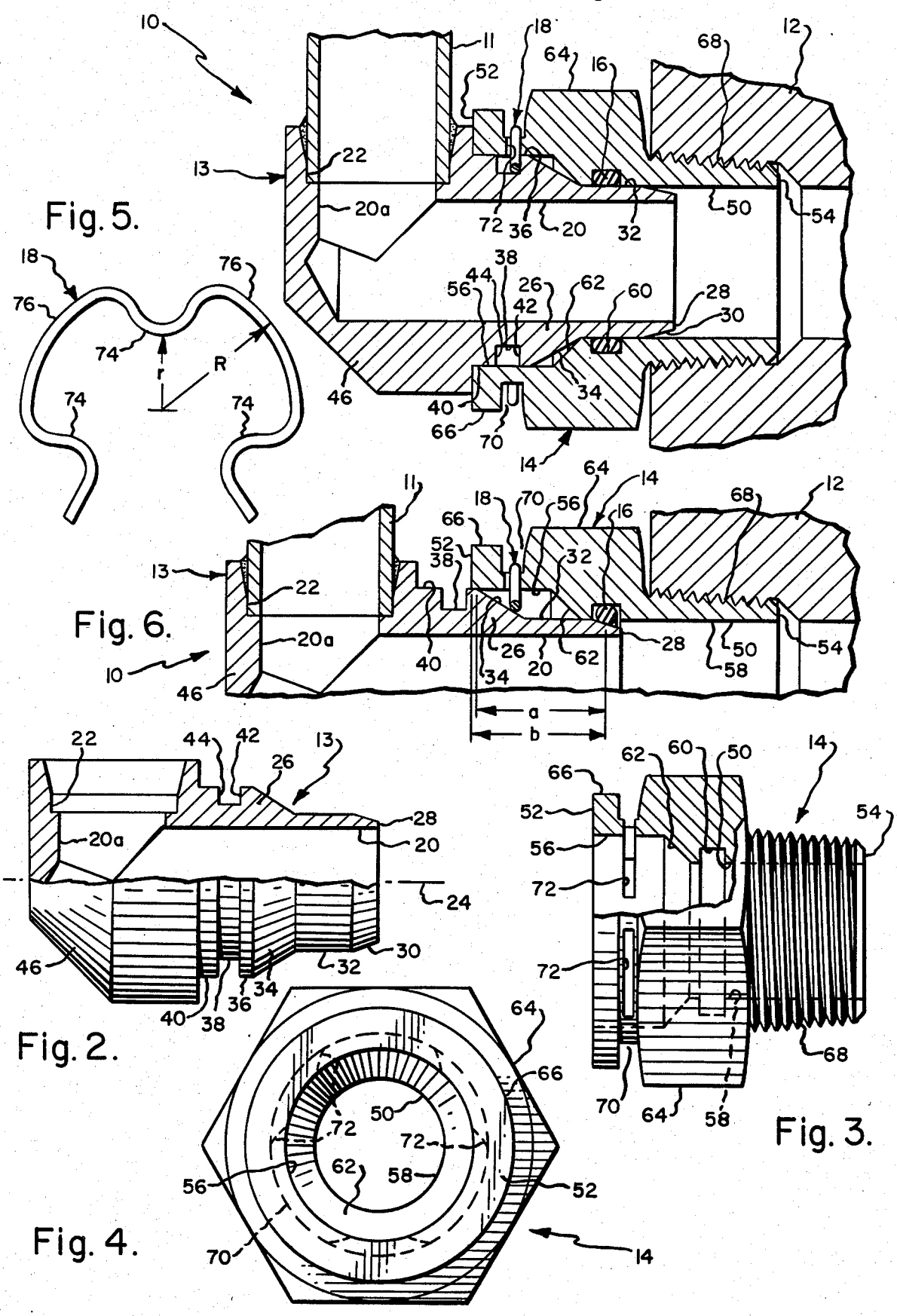

FLUID COUPLING ASSEMBLY

FIELD OF THE INVENTION

The present invention relates generally to a novel fluid coupling capable of connecting a fluid line to a port, and more particularly, to a fluid coupling assembly of the type wherein a female subassembly can be screwed into a threaded port, the male member then being merely pressed into the female subassembly until it is secured therein in sealing relationship by a spring clip.

BACKGROUND

In industry there is a continuing demand for improved fluid couplings of relatively low cost and which can be assembled with a minimum of labor, the fluid coupling assemblies in turn having satisfactory performance characteristics. It is also desirable that such fluid couplings can be readily assembled in tight quarters. For example, in the automotive industry, it is necessary to connect fluid lines to an automatic transmission, the fluid lines in turn being connected at the other end to a cooler disposed within the header of a radiator. When connecting the fluid line to the transmission, it is frequently necessary to work in very close quarters requiring excessive labor time. While present fluid line to transmission couplings perform in a satisfactory manner, once assembled it is also frequently difficult to disassemble such fluid lines from the transmission, particularly after a car has been in service for some time and parts have become corroded due to galvanic action. Therefore, it is desirable that a coupling be developed for such installations which will perform in a satisfactory manner, which coupling can be disconnected after assembly, and additionally which can be assembled with minimum labor time. It is also desirable that such a coupling be of relatively low cost.

OBJECT AND SUMMARY OF THE INVENTION

It is therefore an object of the present invention to provide a novel fluid coupling of low cost and satisfactory performance characteristics which can be readily assembled in close quarters and which furthermore can be disassembled after an extended period of use.

The above objects and other objects and advantages of the present invention are accomplished by providing a novel fluid coupling assembly which includes a male member which may be secured to one end of a fluid line and a female member that is provided with threads at one end. The female member is initially being provided with a spring clip and an O-ring forming a female subassembly. The female subassembly is screwed into a threaded port and then the male member simply being inserted into the female subassembly until a shoulder on the male member is engaged by the spring clip to hold the male member in its assembled sealing relationship.

The preceding object and other objects and advantages of this invention will become more apparent after a consideration of the following detailed description taken in conjunction with the accompanying drawings in which a preferred form of this invention is illustrated.

BRIEF DESCRIPTION OF THE DRAWINGS

FIG. 1 is an assembly view of the fluid coupling assembly of this invention, parts being shown in section for purposes of clarity.

FIG. 2 is a side view in partial section of the male member which may be coupled to the female member of this invention.

FIG. 3 is a side view in partial section of the female member of the fluid coupling assembly of this invention.

FIG. 4 is a top view of the female coupling shown in FIG. 3.

FIG. 5 is a top view of the spring clip which is utilized to hold the male member within the female member.

FIG. 6 is a view on an enlarged scale showing the male member partially assembled within the female member.

DETAILED DESCRIPTION

Referring first to FIG. 1, it can be seen that the fluid coupling assembly of this invention, indicated generally at 10, can be used to connect a fluid line 11 to a threaded port in a structure 12. The coupling 10 is formed of four components, there being a male member indicated generally at 13, a female member indicated generally at 14, an O-ring 16 and a spring clip indicated generally at 18. When the parts are in their assembled relationship, as shown in FIG. 1, portions of the spring clip will engage a shoulder surface of the male member to maintain a coupling portion of the male member in sealing relationship with the O-ring in a manner which will be more fully brought out below.

Referring now in greater detail to FIG. 2 in which the male member is illustrated, it can be seen that the male member 13 has a bore 20 which extends through the body of the male member. In the particular design illustrated, the bore has a right angle portion 20a which includes a fluid line receiving portion 22. While the fluid line receiving portion 22 is at right angles to the axis 24 of coupling portion 26 of the male member which is to be inserted into the female member, it may be desirable in some situations to have it concentric with the axis of the coupling portion. In any event, the fluid line receiving portion 22 can receive one end of a fluid line 11 which may be brazed therein or secured in any other conventional fashion. The bore 20 terminates at one end or the free end 28 of the coupling portion 26. The coupling portion has the following exterior surface portions which extend progressively away from the free end 28: a first tapered portion 30 in the form of a conical section; a first reduced diameter cylindrical portion 32; a second tapered portion 34 also in the form of a conical section; a first enlarged diameter cylindrical portion 36; a second reduced diameter cylindrical portion 38; and a second enlarged diameter cylindrical portion 40. There is a generally radially outwardly extending shoulder surface 42 disposed between the first enlarged diameter portion 36 and the second reduced diameter portion 38, and there is a further generally radially extending surface 44 between the second reduced diameter portion 38 and the second enlarged diameter portion 40. As can be seen from FIG. 2, all of these components are disposed beneath the head 46 of the male fitting which may be of any general configuration but in the preferred embodiment is of a hexagonal cross section. The fluid line receiving portion 22 of the bore is disposed within the head, and, as can be seen from FIG. 1, the head 46 is not inserted into the female member 14.

Referring now in greater detail to FIG. 3 in which the female member is illustrated, it can be seen that the female member 14 has a bore 50 which extends from one end 52 of the body of the female member to the other end 54. The bore has an enlarged diameter cylindrical portion 56 disposed adjacent the one end 52 and a reduced diameter cylindrical portion 58 adjacent the other end 54. The reduced diameter portion 58 is provided with an O-ring receiving groove 60. Disposed between the cylindrical portions 56 and 58 is a tapered portion 62.

The exterior surface of the body of the female member 14 is provided with an enlarged diameter external surface portion 64 which preferably is hexagonal in cross section as can best be seen from FIG. 4. Disposed between the enlarged portion 64 and the one end 52 of the body is a first reduced diameter portion 66. Disposed between the enlarged diameter portion 64 and the other end 54 of the body is a second reduced diameter portion 68, which portion is provided with threads. This portion can be threaded into the threaded port in the structure 12 simply by turning the enlarged portion 64 until a fluid tight seal has been accomplished. The first reduced diameter portion 66 is provided with a spring clip receiving groove 70. Finally, the female member is provided with slots 72, preferably three in number, which extend between the spring clip receiving groove 70 and the enlarged diameter portion 56 of the bore 50.

Referring now in greater detail to FIG. 5 in which the spring clip 18 is illustrated, it can be seen that the spring clip is formed from a single piece of spring wire. The wire is preferably formed with three radially inwardly extending U-shaped lobes or sections 74, the sections 74 being interconnected by outer circumferential portions 76. It should be noted that the ends of the U-shaped sections and the circumferential portions 76 all lie substantially the same distance R from the center of the spring clip. Similarly, the inner portions or bight portions of the U-shaped sections 74 also lie the same radial distance r from the center of the spring clip. The major radius R of the spring clip is so selected that when the spring clip is assembled into the spring clip receiving groove 70, no portions of the spring clip will project beyond the enlarged diameter surface portion 64 to prevent inadvertent engagement of the spring clip after assembly. In fact, in the preferred embodiment the radius R is less than the radius of the first reduced diameter portion 66. When the clip 18 is assembled into the groove 70, the U-shaped sections 74 of the spring clip will extend through the slots and are capable of engaging the shoulder surface 42 to hold the male member 13 within the female member in sealing relationship after assembly.

The parts are assembled by first assembling the O-ring and the spring clip into the female member to form a female subassembly. The female subassembly is then screwed into the threaded port and can be finally tightened by the application of a socket wrench or the like which engages the flat surfaces of the hexagonal enlarged diameter surface portion 64. If the threaded port is part of a transmission, the transmission can now be installed in a car or the like. In the meantime, the male member is brazed or otherwise secured to a fluid line. In the final assembly it is then only necessary to insert the male member into the female subassembly until the bight portions of the spring clip engage the shoulder surface 42 of the male member. In order to insure that the O-ring 16 is properly engaged by the first tapered surface portion 30 as the parts are being assembled, it is desirable that the distance between the leading edge of the cylindrical surface portion 36 and that portion of the first tapered surface 30 which initially engages the O-ring, which distance is indicated at a in FIG. 6, be not greater than the distance b between that portion of the O-ring initially contacted by the first tapered surface 30 and the end 52 of the female member. By maintaining the above dimensional relationships, the male member is essentially concentric with the female member as the O-ring is being compressed thereby minimizng the likelihood that the O-ring will be damaged during insertion of the male member. As the male member is advanced into the female member the bight portions of the spring clip will be contacted by the second tapered surface 34 and spread outwardly to such an extent that the cylindrical surface 36 can then pass beneath the bight portions until the bight portions of the spring clip can spring behind the shoulder surface 42 thereby holding the parts in their assembled relationship. Once the parts have been assembled, to disassemble the parts for subsequent service, it is only necessary to spread the spring clip which can be done by engaging the free end of one of the U-shaped sections 70 and springing out the spring clip.

While a preferred embodiment has been disclosed above, it is to be understood that the invention is not to be limited to the above embodiment as various alternative embodiments will occur to those having ordinary skill in the art.

What is claimed is:

1. A fluid coupling for connecting a fluid line to a threaded port, the fluid coupling comprising in combination:

a male member having a bore which terminates at the free end of the member, the bore having a fluid line receiving portion at its other end, the exterior surface of the body of the male member further being provided with first and second reduced diameter cylindrical surface, a first tapered portion between the first reduced diameter surface and the free end of the fitting, an enlarged diameter cylindrical portion between the first and second reduced diameter cylindrical portions, a radially outwardly extending shoulder surface between the second reduced diameter cylindrical portion and the enlarged diameter cylindrical portion, and a second tapered portion between said enlarged diameter cylindrical portion and the first reduced diameter cylindrical portion; and a female subassembly including a female member provided with a bore extending through the body of the female member from one end to the other end, the bore of the female member having an enlarged diameter cylindrical portion at the one end and a reduced diameter cylindrical portion adjacent the other end, the reduced diameter cylindrical portion being provided with an O-ring receiving groove, an O-ring disposed within said O-ring receiving groove, the diameter of the enlarged and reduced diameter cylindrical portions being just slightly greater than the diameter of the enlarged and first reduced diameter cylindrical portions of said male member, respectively, the distance from said one end of the bore of the female member to that portion of the O-ring which is initially contacted by the male member when inserted into the female member being essentially equal to or greater than the distance from the enlarged diameter exterior cylindrical surface portion of the male member to that portion of the first tapered portion of the male member which initially contacts the O-ring when the male member is inserted into the female member, the body of the female member having an enlarged diameter exterior surface portion between the ends, first and second reduced diameter exterior surface portions adjacent said one end and said other end, respectively, the first reduced diameter exterior surface portion having a spring clip receiving groove therein, and the second reduced diameter exterior surface portion being provided with threads for threading into said threaded port, the female member further being provided with slots extending between the spring clip receiving groove and the enlarged diameter cylindrical portion of the bore; and a spring clip carried at least partially within the spring clip receiving groove, the overall diameter of the spring clip being less than the diameter of the enlarged diameter exterior surface portion of the female member, and portions of the spring clip passing through the slots and disposed in juxtaposition to the shoulder surface of the male member to maintain the first reduced diameter exterior cylindrical surface portion of the male member in sealing relationship with said O-ring.

2. The fluid coupling as set forth in claim 1 wherein the fluid line receiving portion of the bore extends at right angles to the axis of the cylindrical surface portions.

3. The fluid coupling as set forth in claim 1 wherein the diameter of the spring clip is less than the diameter of the first reduced diameter portion of the female member.

* * * * *